United States Patent
Noda

(10) Patent No.: US 7,988,904 B2
(45) Date of Patent: Aug. 2, 2011

(54) RESIN MOLDING PROCESS AND RESIN-MOLDING MOLD DEVICE

(75) Inventor: Yuuichirou Noda, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 0 days.

(21) Appl. No.: 12/921,511

(22) PCT Filed: Mar. 10, 2009

(86) PCT No.: PCT/JP2009/054509
§ 371 (c)(1),
(2), (4) Date: Sep. 8, 2010

(87) PCT Pub. No.: WO2009/122866
PCT Pub. Date: Oct. 8, 2009

(65) Prior Publication Data
US 2011/0001266 A1    Jan. 6, 2011

(30) Foreign Application Priority Data
Mar. 31, 2008  (JP) .................................. 2008-092323

(51) Int. Cl.
*B29C 45/56* (2006.01)
(52) U.S. Cl. .................... 264/328.7; 425/555; 425/577
(58) Field of Classification Search ............... 264/328.7, 264/319, 336; 425/552, 555, 577
See application file for complete search history.

(56) References Cited

U.S. PATENT DOCUMENTS

| 4,832,676 | A | * | 5/1989 | Johns et al. | 264/320 |
| 5,439,371 | A | * | 8/1995 | Sawaya | 425/553 |
| 5,656,234 | A | * | 8/1997 | Kaneishi et al. | 264/572 |
| 6,929,761 | B2 | * | 8/2005 | Gelardi et al. | 264/1.31 |
| 7,670,539 | B2 | * | 3/2010 | Kang | 264/328.14 |

FOREIGN PATENT DOCUMENTS

| JP | 51-119062 A | 10/1976 |
| JP | 5-116194 A | 5/1993 |
| JP | 2002-326260 A | 11/2002 |
| JP | 3512595 B2 | 1/2004 |
| JP | 2004-82482 A | 3/2004 |

OTHER PUBLICATIONS

English abstract of Japan reference 5-116194.*

* cited by examiner

*Primary Examiner* — Jill L Heitbrink
(74) *Attorney, Agent, or Firm* — Arent Fox, LLP

(57) ABSTRACT

A resin-molding mold device is provided for carrying out the resin molding process to mold the resin molded article, wherein when cooling after charging a molten synthetic resin into a cavity (14) and maintaining the pressure, a movable core (11) is urged to the side in which the capacity of the cavity (14) is decreased. This enables a resin molded article having a proper shape to be reliably molded by preventing a design surface from parting from a cavity wall surface when die-molding the resin molded article by charging a molten synthetic resin into a cavity formed from a plurality of dies.

10 Claims, 4 Drawing Sheets

RESIN MOLDING PROCESS AND RESIN-MOLDING MOLD DEVICE

TECHNICAL FIELD

The present invention relates to an improvement of a resin molding process for die-molding a resin molded article by charging a molten synthetic resin into a cavity formed from a plurality of dies, and a resin-molding mold device for carrying out the resin molding process.

BACKGROUND ART

An arrangement in which, when molding a resin molded article, a mold core on the side opposite to a design surface is separated from a resin surface so as to form a gap, thus reducing heat transference between the resin surface and the mold core and thereby preferentially causing a sink mark in a portion that faces the gap, and as a result suppressing a sink mark on the design surface, is already known from Patent Publication 1.
Patent Publication 1: Japanese Patent No. 3512595

DISCLOSURE OF INVENTION

Problems to be Solved by the Invention

In the arrangement disclosed in Patent Publication 1 above, there is a possibility that due to a suction action when separating the mold core the design surface will also be parted from a cavity wall surface; in this case, since it is difficult to mold a resin molded article in a proper shape, a vent for providing communication between the gap and the exterior is provided to thus prevent the gap from attaining a negative pressure state, but there is a possibility that a suction action will be caused due to the speed of movement during the separation of the mold core. Moreover, in the arrangement disclosed in Patent Publication 1 above, since a force that would press the resin onto the cavity wall surface on the design surface side is not generated, parting from the die naturally occurs accompanying shrinkage during cooling of the resin, and heat absorption by the die is inhibited.

The present invention has been accomplished in the light of such circumstances, and it is an object thereof to provide a resin molding process and a resin-molding mold device that enable a resin molded article having a proper shape to be reliably molded by preventing a design surface from parting from a cavity wall surface and also enable a sink mark to be prevented from occurring on the design surface.

Means for Solving the Problems

In order to attain the above object, according to a first aspect of the present invention, there is provided a resin molding process for die-molding a resin molded article by charging a molten synthetic resin into a cavity formed from a plurality of dies, comprising the step of urging a movable core, which has a molding surface forming at least part of a non-design surface on the side opposite to a design surface of the resin molded article, toward the side on which the capacity of the cavity is decreased, when cooling after charging the molten synthetic resin into the cavity and maintaining the pressure.

Further, according to a second aspect of the present invention, there is provided a resin-molding mold device for carrying out the resin molding process defined so as to mold the resin molded article, the device comprising a movable core support, a movable core, and resilient means, the movable core support being capable of moving between a forward position in which the movable core support is close to the cavity side and a backward position in which the movable core support is separated from the forward position by a fixed distance toward the side on which the movable core support is separated from the cavity and being capable of switching between the forward position when charging the molten synthetic resin into the cavity and maintaining the pressure and the backward position when cooling the molten synthetic resin, the movable core having a molding surface forming at least part of the non-design surface on the side opposite to the design surface of the resin molded article and being supported on the movable core support so that the movable core can move restrictedly relative to the movable core support in the same direction as the direction of movement of the movable core support, and the resilient means being provided between the movable core and the movable core support so as to exhibit an urging force resiliently urging the movable core toward the side on which the capacity of the cavity is decreased with a spring load that is smaller than a load acting on the movable core due to molten synthetic resin being charged into the cavity.

EFFECTS OF THE INVENTION

In accordance with the first aspect of the present invention, since, when cooling after charging the molten synthetic resin into the cavity and maintaining the pressure, the movable core having a molding surface forming at least part of the non-design surface is urged toward the side on which the cavity capacity is decreased, the resin within the cavity is pressurized by the movable core so that the design surface is pressed against the cavity wall surface, thus preventing the design surface from parting from the cavity wall surface and thereby reliably molding the resin molded article with a proper shape. Moreover, by setting the volume for the movable core small so as to decrease the rate at which the resin within the cavity is deprived of heat by the movable core, a sink mark is thus easily produced on the non-design surface, and consequently it is possible to suppress the generation of a sink mark on the design surface.

Furthermore, in accordance with the second aspect of the present invention, since the movable core support is at a forward position close to the cavity side when charging the molten synthetic resin into the cavity and maintaining the pressure, although the movable core is urged toward the side on which the cavity capacity is decreased by the resilient force of the resilient means, since the load acting on the movable core due to the molten synthetic resin being charged into the cavity exceeds the resilient force of the resilient means, the movable core is present at a position in which the molding surface thereof forms part of the cavity wall surface. When the molten synthetic resin charged into the cavity is cooled, although the movable core support moves to the backward position, the movable core pressurizes the resin within the cavity by means of the resilient force of the resilient means, thus exhibiting the effect of the first aspect. Moreover, when the molten synthetic resin is cooled, since a gap is formed between the movable core and the movable core support, it becomes difficult for heat to be transferred from the movable core to the movable core support, and it becomes difficult for the temperature of the non-design surface of the resin within the cavity to decrease; as a result it becomes possible to suppress more effectively a sink mark on the design surface.

EXPLANATION OF REFERENCE NUMERALS AND SYMBOLS

Figure 1:
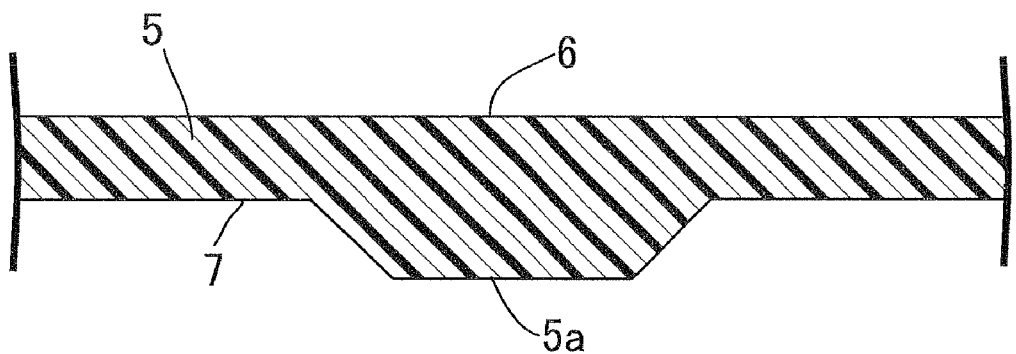
FIG. 1 is a vertical sectional view of part of a resin molded article. (first embodiment)

5 Resin molded article
6 Design surface
7 Non-design surface
8 Resin-molding mold device
9 Fixed die
10 Movable die
11 Movable core, which is a die
12 Molding surface
14 Cavity
15 Movable core support
21 Spring, which is resilient means

BEST MODE FOR CARRYING OUT THE INVENTION

A mode for carrying out the present invention is explained below by reference to one embodiment of the present invention shown in the attached drawings.

Embodiment 1

FIG. 1 to FIG. 4 show one embodiment of the present invention.

First, in FIG. 1, this resin molded article 5 is formed in, for example, a flat plate shape with one surface as a design surface 6 and another surface on the side opposite to the design surface 6 as a non-design surface 7, and a projection 5a projecting from the non-design surface 7 is projectingly and integrally provided with the resin molded article 5.

Figure 2:
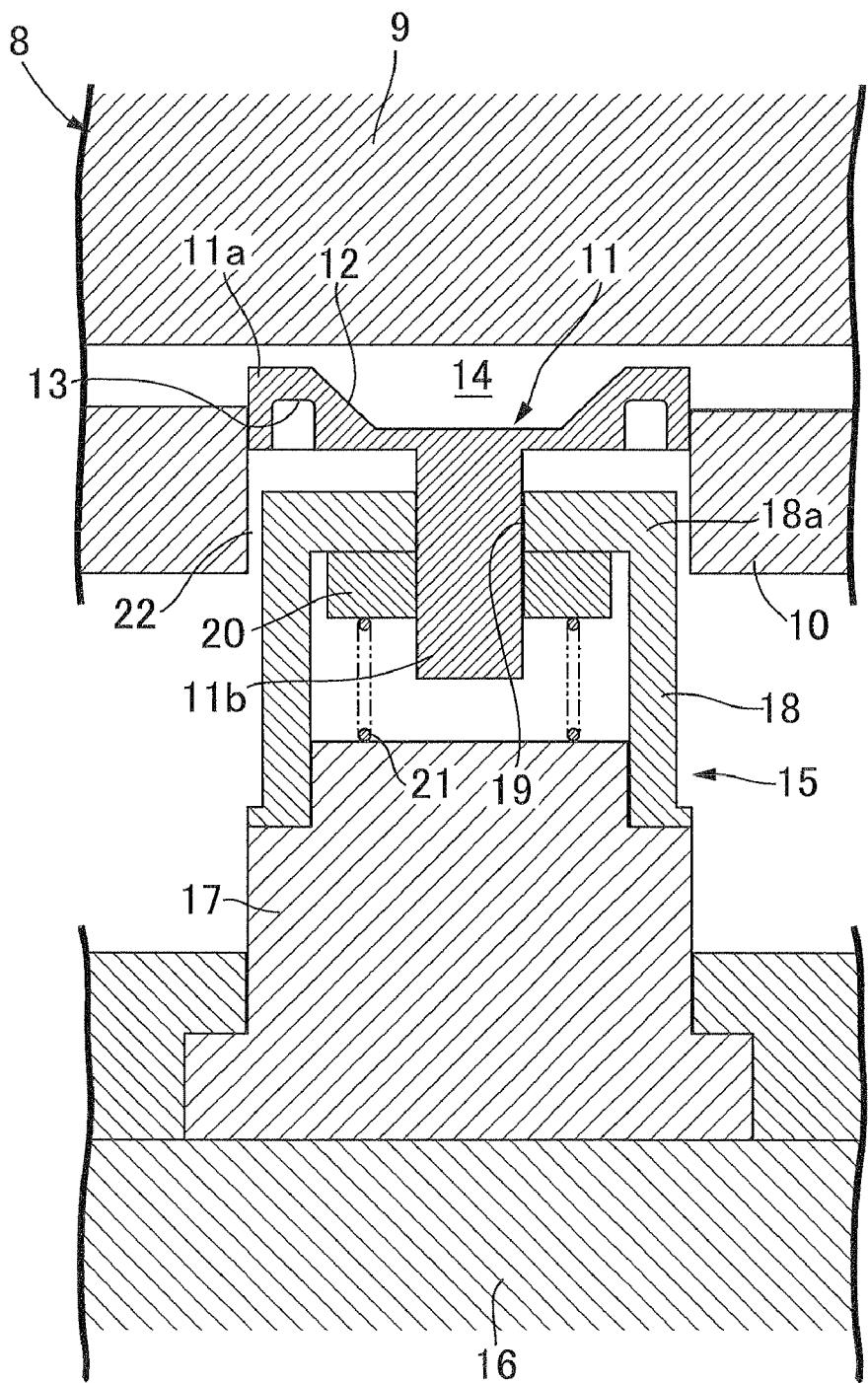
FIG. 2 is a vertical sectional view showing part of a resin-molding mold device when closed. (first embodiment)

The resin molded article 5 is die-molded by a resin-molding mold device 8 as shown in FIG. 2, and since the thickness of the resin molded article 5 in a portion in which the projection 5a is provided is larger than that of other portions, a sink mark is easily caused in the projection 5a portion when molding the resin molded article 5; in order to prevent such a sink mark from being caused the resin molding process in accordance with the present invention is carried out, and the resin-molding mold device 8 is arranged so that the resin molding process can be carried out appropriately.

The resin-molding mold device 8 includes a fixed die 9 for forming the design surface 6 of the resin molded article 5, a movable die 10 that can move toward and away from the fixed die 9 and forms a portion, excluding the projection 5a, of the non-design surface 7 of the resin molded article 5, and a movable core 11 as a die having a molding surface 12 forming at least part of the non-design surface 7, the molding surface 12 being formed in a shape that forms, of the non-design surface 7, the projection 5a.

The plurality of dies, that is, the fixed die 9, the movable die 10, and the movable core 11 form a cavity 14 corresponding to an outer shape of the resin molded article 5, and the resin molded article 5 is formed by charging a molten synthetic resin into the cavity 14.

The movable core 11 integrally has a disk-shaped core main portion 11a forming the molding surface 12, and a shaft portion 11b provided so as to be connected at right angles to a central part of the core main portion 11a on the side opposite to the molding surface 12, an annular recess 13 for decreasing the volume of the movable core 11 being provided on the surface of the core main portion 11a on the side opposite to the molding surface 12.

The movable core 11 is supported on a movable support core 15. This movable core support 15 is formed from a columnar body 17 fixed to a back plate 16, and a bottomed cylindrical body 18 formed in a bottomed cylindrical shape having an end wall 18a at the upper end and joined coaxially to an upper part of the columnar body 17, the movable core support 15 being capable of moving, by vertical movement of the back plate 16, between a forward position in which it is close to the cavity 14 (a position shown in FIG. 2 and FIG. 3) and a backward position in which it is separated by a fixed distance from the forward position toward the side on which it is separated from the cavity 14 (position shown in FIG. 4).

A support hole 19 is provided in a central part of the end wall 18a of the bottomed cylindrical body 18, and the shaft portion 11b of the movable core 11 extends slidably through the support hole 19. Moreover, a disk-shaped retainer 20 is fixedly secured to the shaft portion 11b within the bottomed cylindrical body 18, and the movable core 11 is supported on the movable core support 15 relatively movably in the same direction as the direction of movement of the movable core support 15 so that the movable core 11 can move between a position in which the retainer 20 abuts against an inner face of the end wall 18a and a position in which the core main portion 11a abuts against an outer face of the end wall 18a.

Furthermore, a spring 21 is provided between the upper end of the columnar body 17 and the retainer 20 within the bottomed cylindrical body 18, the spring 21 being resilient means for resiliently urging the movable core 11 toward the side on which the capacity of the cavity 14 is decreased, and the spring load exhibited by the spring 21 is set to be smaller than the load acting on the movable core 11 due to a molten synthetic resin being charged into the cavity 14.

Furthermore, a gap 22 is formed between the outer periphery of the bottomed cylindrical body 18 of the movable core support 15 and the movable die 10 around the bottomed cylindrical body 18 by a method such as chamfering part of an outer face of the bottomed cylindrical body 18, and a gap formed between the core main portion 11a of the movable core 11 and the movable core support 15 communicates with the exterior via the gap 22. This prevents the gap formed between the core main portion 11a and the movable core support 15 from attaining a negative pressure state.

Figure 3:
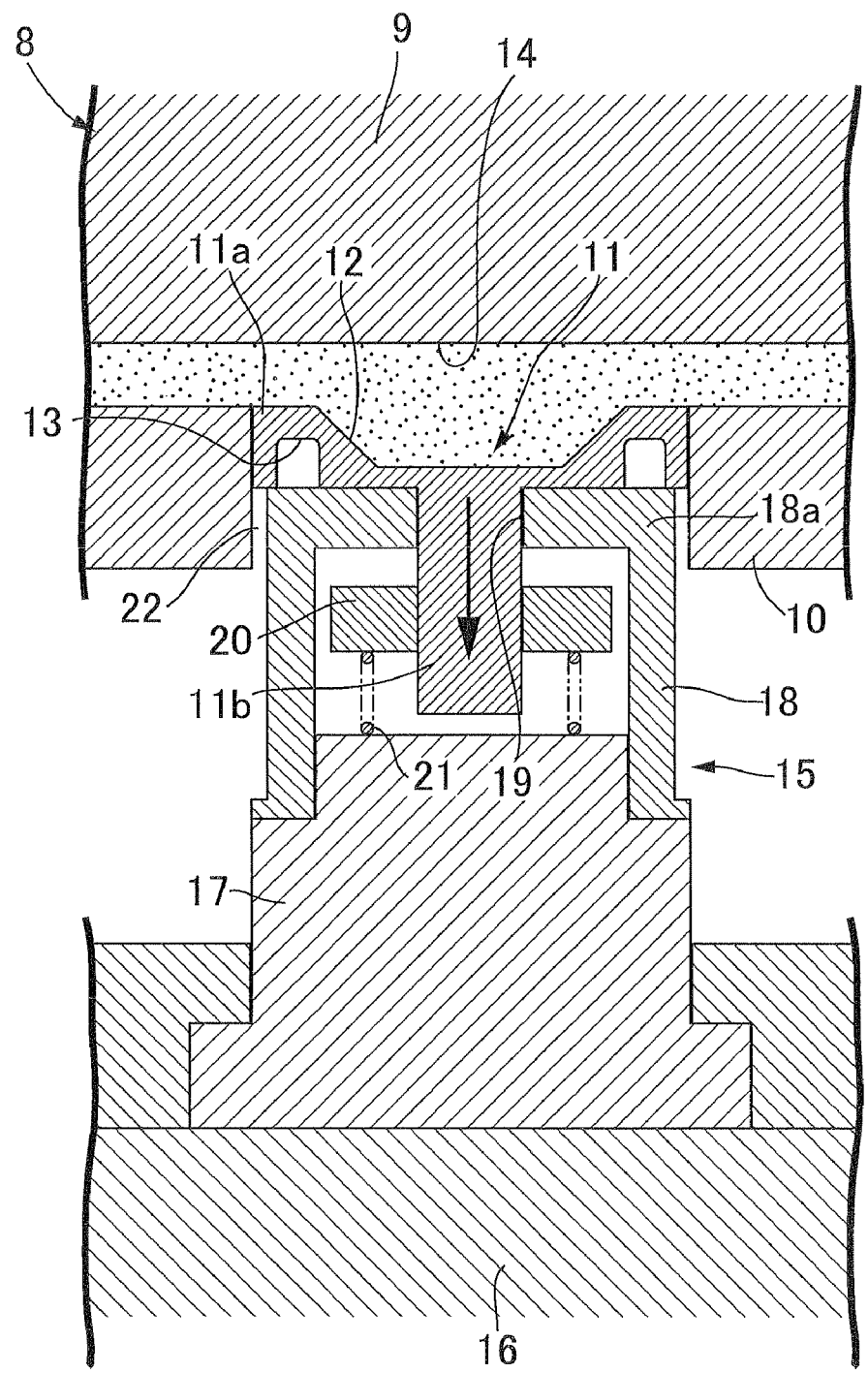
FIG. 3 is a vertical sectional view showing part of the resin-molding mold device when a molten synthetic resin is charged and the pressure is maintained. (first embodiment)

When the resin-molding mold device 8 is closed, as shown in FIG. 2, the movable core support 15 is at the forward position, and the movable core 11 is at a position in which the retainer 20 abuts against the end wall 18a of the bottomed cylindrical body 18, that is, a position in which a gap is formed between the core main portion 11a and the end wall 18a. When a molten synthetic resin is pressurized and charged into the interior of the cavity 14 and the pressurized state is maintained, as shown in FIG. 3, although the movable core support 15 is at the forward position, since the spring load of the spring 21 urging the movable core 11 is smaller than the load acting on the movable core 11 by charging of the molten synthetic resin into the cavity 14, the movable core 11 moves backward against the spring urging force of the spring 21 until the core main portion 11a abuts against the end wall 18a, and in this state the molding surface 12 of the movable core 11 is flush with the cavity wall surface of the movable die 10.

Figure 4:
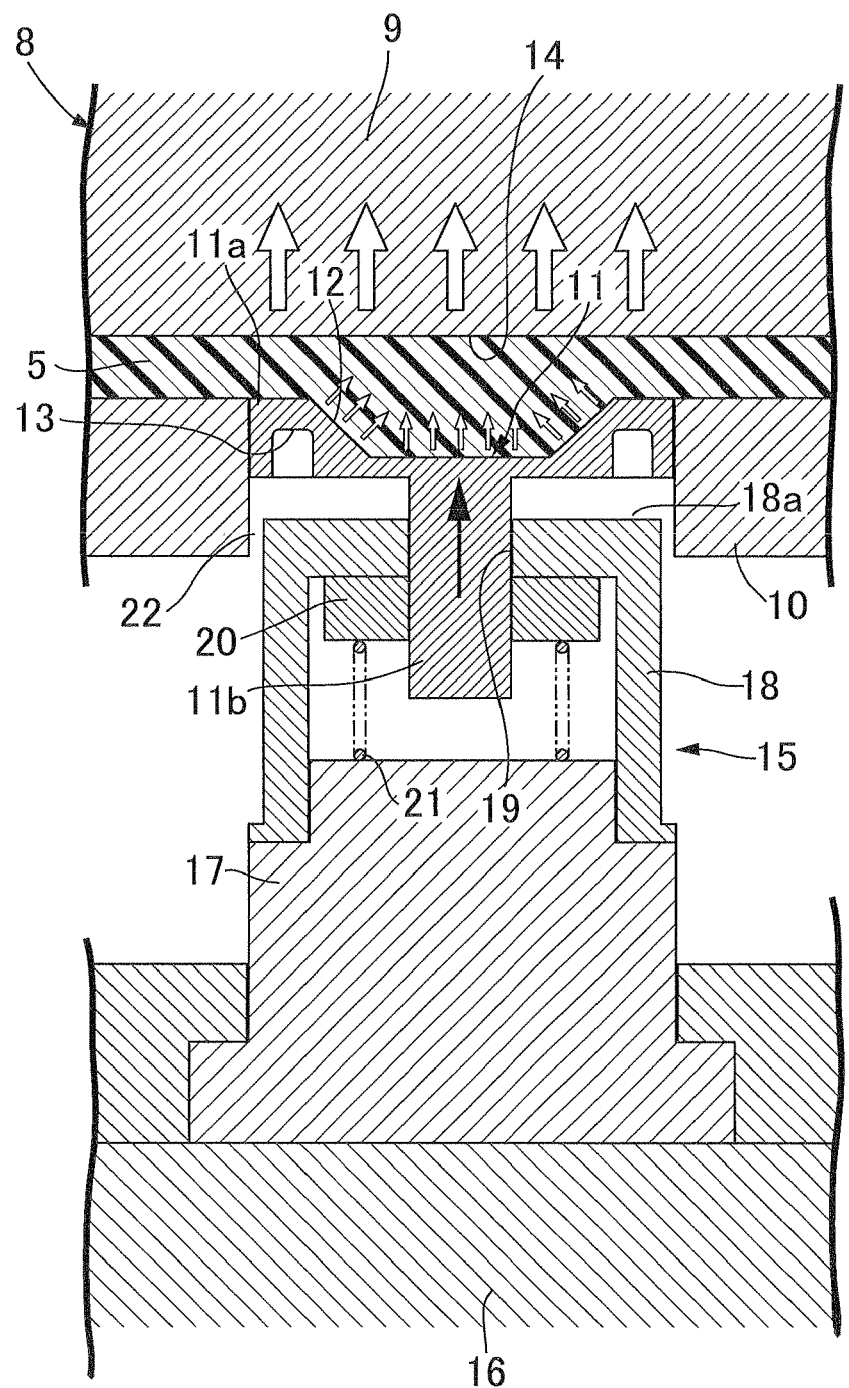
FIG. 4 is a vertical sectional view showing part of the resin-molding mold device when cooling. (first embodiment)

When the molten synthetic resin charged into the cavity 14 is cooled, as shown in FIG. 4, the movable core support 15 moves to the backward position. The movable core 11 is urged by the urging force of the spring 21 to the side on which the capacity of the cavity 14 is decreased, and in this state the design surface side of the resin within the cavity 14 is pressed against the cavity wall surface side of the fixed core 9, and a gap is formed between the movable core 11 and the movable core support 15.

The operation of this embodiment is now explained. In the resin-molding mold device 8, when charging a molten synthetic resin into the cavity 14 and maintaining the pressure, the movable core support 15 is at the forward position in which it is close to the cavity 11 side, and the movable core 11 is urged to the side on which the capacity of the cavity 14 is decreased by the resilient force of the spring 21, but since the load acting on the movable core 14 due to the molten synthetic resin being charged into the cavity 14 exceeds the spring force of the spring 21, the movable core 11 is at a position in which the molding surface 12 thereof forms part of the cavity wall surface. Subsequently, when the molten synthetic resin charged into the cavity 14 is cooled, the movable core support 15 moves to the backward position, but the movable core 11 pressurizes the resin within the cavity 14 by means of the spring force of the spring 21. That is, the resin within the cavity 14 is pressurized by the movable core 11 so that the design surface is pressed against the cavity wall surface, and the resin molded article 5 having a proper shape can be reliably molded while preventing the design surface from parting from the cavity wall surface.

Moreover, the volume of the movable core 11 is set small by a design such as the annular recess 13 being provided in the core main portion 11a, and by decreasing the rate at which the resin within the cavity 14 is deprived of heat by the movable core 11 a sink mark can easily be produced on the non-design surface 7, and as a result it is possible to suppress the generation of a sink mark on the design surface 6.

Furthermore, when cooling, since a gap is formed between the movable core 11 and the movable core support 15, it becomes difficult for heat to be transferred from the movable core 11 to the movable core support 15, and it becomes difficult for the temperature of the non-design surface 7 of the resin within the cavity 14 to decrease; as a result it becomes possible to suppress more effectively a sink mark on the design surface 6.

An embodiment of the present invention is explained above but the present invention is not limited to the embodiment and may be modified in a variety of ways as long as the modifications do not depart from the present invention described in Claims.

The invention claimed is:

1. A resin molding process for die-molding a resin molded article by charging a molten synthetic resin into a cavity formed from a plurality of dies, comprising the steps of:
   providing a first die having a design surface facing the cavity;
   providing a movable core having a molding surface forming at least part of a non-design surface on the side opposite the design surface of the molded resin article, wherein the movable core moves relative to a movable core support and wherein the movable core is biased toward the first die;
   moving the movable core support and the movable core to a position toward the first die;
   charging the molten synthetic resin into the cavity, wherein the molten resin moves the movable core in a direction opposite the first die;
   moving the movable core support in a direction opposite the first die, while continuing to bias the movable core toward the side on which the capacity of the cavity is decreased, when cooling after charging the molten synthetic resin into the cavity.

2. The resin molding process according to claim 1, further comprising:
   providing a movable die surrounding the movable core, wherein a first gap is formed between an outer periphery of the movable core and the movable die.

3. The resin molding process according to claim 2, further comprising:
   forming a second gap between the movable core and the movable core support when cooling, the second gap communicating with the first gap.

4. The resin molding process according to claim 1, wherein the movable core includes an annular recess.

5. A resin-molding mold device for carrying out a resin molding process so as to mold the resin molded article, the device comprising:
   a movable core support;
   a movable core; and
   resilient means,
   wherein the movable core support is capable of moving between a forward position in which the movable core support is close to the cavity side and a backward position in which the movable core support core is separated from the forward position by a fixed distance toward the side on which the movable core support is separated from the cavity and is capable of switching between the forward position when charging the molten synthetic resin into the cavity and maintaining the pressure and the backward position when cooling the molten synthetic resin,
   wherein the movable core has a molding surface forming at least part of the non-design surface on the side opposite to the design surface of the resin molded article and is supported on the movable core support so that the movable core can move restrictedly relative to the movable core support in the same direction as the direction of movement of the movable core support, and
   wherein the resilient means are provided between the movable core and the movable core support so as to exhibit an urging force resiliently urging the movable core toward the side on which the capacity of the cavity is decreased with a spring load that is smaller than a load acting on the movable core due to molten synthetic resin being charged into the cavity.

6. The resin-molding mold device according to claim 5, wherein the resilient means are configured to bias the movable core toward the side on which the capacity of the cavity is decreased, when cooling after charging the molten synthetic resin into the cavity and when the movable core is moved toward the backward position.

7. The resin-molding mold device according to claim 5, further comprising:
   a movable die surrounding the movable core, wherein a first gap is formed between an outer periphery of the movable core and the movable die.

8. The resin-molding mold device according to claim 7, wherein the movable core support is configured to form a second gap formed between the movable core and the movable core support during cooling, wherein the second gap communicates with the first gap.

9. The resin-molding mold device according to claim 5, wherein the movable core includes an annular recess.

10. The resin-molding mold device according to claim 9, further comprising:
a movable die surrounding the movable core, wherein a first gap is formed between an outer periphery of the movable core and the movable die, wherein the movable core support is configured to form a second gap formed between the movable core and the movable core support during cooling, wherein the second gap communicates with the first gap, and wherein the annular recess is adjacent the second gap.

* * * * *